United States Patent
He

(10) Patent No.: US 9,348,175 B2
(45) Date of Patent: May 24, 2016

(54) LIQUID CRYSTAL DEVICE AND THE LIQUID CRYSTLA PANEL THEREOF

(71) Applicant: Shenzhen China Star Optoelectronics Technology Co., Ltd., Shenzhen, Guangdong (CN)

(72) Inventor: Hu He, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 177 days.

(21) Appl. No.: 14/357,213

(22) PCT Filed: Apr. 3, 2014

(86) PCT No.: PCT/CN2014/074743
§ 371 (c)(1),
(2) Date: May 9, 2014

(87) PCT Pub. No.: WO2015/149334
PCT Pub. Date: Oct. 8, 2015

(65) Prior Publication Data
US 2015/0277188 A1    Oct. 1, 2015

(30) Foreign Application Priority Data

Mar. 31, 2014 (CN) .......................... 2014 1 0126235

(51) Int. Cl.
*G02F 1/1335*    (2006.01)
*F21V 8/00*      (2006.01)

(52) U.S. Cl.
CPC ........ *G02F 1/133617* (2013.01); *G02B 6/0073* (2013.01)

(58) Field of Classification Search
CPC .................. G02B 26/02; G02B 6/0073; G02F 2001/133614; G02F 1/133617; H01J 1/63; H01J 61/48; B05D 5/06
See application file for complete search history.

(56) References Cited

U.S. PATENT DOCUMENTS

| | | | | |
|---|---|---|---|---|
| 9,182,631 B2 * | 11/2015 | Iwata | ................ | H01L 51/5268 |
| 2008/0231172 A1 * | 9/2008 | Chou | ................ | C09K 11/7721 |
| | | | | 313/503 |
| 2009/0129055 A1 * | 5/2009 | Morizawa | .......... | C09K 11/7731 |
| | | | | 362/97.1 |
| 2010/0308332 A1 * | 12/2010 | Ono | ...................... | H05B 33/28 |
| | | | | 257/59 |
| 2011/0044046 A1 * | 2/2011 | Abu-Ageel | ............... | F21K 9/00 |
| | | | | 362/259 |

FOREIGN PATENT DOCUMENTS

CN    101943817 A    1/2011

* cited by examiner

*Primary Examiner* — Huyen Ngo
(74) *Attorney, Agent, or Firm* — Andrew C. Cheng

(57) ABSTRACT

A liquid crystal device is provided including: a backlight module comprising a light source; a first substrate comprising a plurality of TFTs, and the first substrate is arranged above the backlight module; a second substrate arranged above the first substrate; a liquid crystal layer arranged between the first substrate and the second substrate; a color filter comprising a plurality of pixels arranged in a matrix form, the color filter is arranged between the second substrate and the liquid crystal layer, and a gap is arranged between the adjacent pixels; a phosphor power layer arranged between the liquid crystal layer and the first substrate or arranged between the color filter and the liquid crystal layer; and wherein portions of the phosphor power layer corresponding to the gaps on the color filter are removed, and lights emitted from the light source passes through the phosphor powder layer and arrive at the color filter.

18 Claims, 5 Drawing Sheets

LIQUID CRYSTAL DEVICE AND THE LIQUID CRYSTLA PANEL THEREOF

BACKGROUND OF THE INVENTION

1. Field of the Invention

The present disclosure relates to liquid crystal display technology, and more particularly to a liquid crystal device (LCD) and the liquid crystal panel thereof.

2. Discussion of the Related Art

Plasma Panel Display (PDP), Organic Light Emitting Diode (OLED), Cathode Ray Tube (CRT) are autoluminescence devices while the Liquid Crystal Displays (LCDs) are non-autoluminescence devices.

Light sources of LCD may include Electroluminescence (EL), Light Emitting Diode (LED) and Cold Cathode Florescent Lamp (CCFL). Among those, the LED is the most popular one. The white light LEDs, operating as the light source of the LCDs are characterized by the advantages such as power saving and small size, and thus are adopted by small-sized LCDs such as mobile phones, personal digital assistants (PDAs), digital cameras, and notebooks.

FIG. 1 is a cross sectional view of one conventional LCD. As shown, the backlight module 11 includes a LED 111, a reflective sheet 112, a light guiding plate 113, and optical films. The lights emitted from the LED 111 are transmitted to the transparent glass substrate 12 via the above-mentioned components. The transparent glass substrate 12 includes a plurality of thin film transistors (TFTs) 121. When being controlled by the TFTs 121, the lights emitted by the LED 111 are transmitted to the color filter 141 of another transparent glass substrate 14. The lights emitted from the LED 111 respectively passes through the red (R) sub-pixels, green (G) sub-pixels, and blue (B) sub-pixels and respectively display red (R), green (G), and blue (B) on the liquid crystal panel.

However, a variety of high color saturation solutions have been developed due to the growing demands toward the LCD color, which include adopting white light LEDs, adopting LEDs with different colors to form the white light, and adopting LED with one single color together with the phosphor power layer. However, as the transmission peak exists in the transmission frequency of the color filter 141 on the first substrate 14, the lights emitted by the LED 111 have a certain peak width. The ratio of long-wavelength lights, such as red lights and green lights, within the light emitted by the LED 111 has to be increased to enhance the color displaying range of the LCD. In this way, the LED 111 efficiency may be decreased, and so does the LCD. The most obvious example is the light utilization rate.

SUMMARY

To overcome the above-mentioned problem, the object of the claimed invention is to provide the liquid crystal device and the liquid crystal panel capable of increasing the light utilization rate.

In one aspect, a liquid crystal device includes: a backlight module including a light source; a first substrate including a plurality of TFTs, and the first substrate is arranged above the backlight module; a second substrate arranged above the first substrate; a liquid crystal layer arranged between the first substrate and the second substrate; a color filter including a plurality of pixels arranged in a matrix form, the color filter is arranged between the second substrate and the liquid crystal layer, and a gap is arranged between the adjacent pixels; a phosphor power layer arranged between the liquid crystal layer and the first substrate or arranged between the color filter and the liquid crystal layer; and wherein portions of the phosphor power layer corresponding to the gaps on the color filter are removed, and lights emitted from the light source passes through the phosphor powder layer and arrive at the color filter.

Wherein the light source is blue light LED, blue-purple light LED, purple light LED, ultraviolet light LED or a combination of the blue light LED, blue-purple light LED, purple light LED, and ultraviolet light LED.

Wherein the first substrate and the second substrate are transparent substrates.

Wherein the backlight module is a direct-lit or an edge-type backlight module.

Wherein each of the pixels comprises red sub-pixels and green sub-pixels.

Wherein the phosphor powder layer is a yellow phosphor powder layer.

Wherein the red sub-pixels of the color filter correspond to the red phosphor powder layer, and the green sub-pixels of the color filter correspond to the green phosphor powder layer.

Wherein the dimension of the red sub-pixel is the same with the dimension of the green sub-pixel, and the dimension of the red sub-pixel or green sub-pixel is larger than the dimension of the gap.

Wherein the dimension of the red sub-pixel is larger than the dimension of the green sub-pixel, and the dimension of the green sub-pixel is larger than the dimension of the gap.

Wherein a blue sub-pixel is arranged with the gap.

In another aspect, a liquid crystal panel includes: a first substrate including a plurality of TFTs, and the first substrate is arranged above the backlight module; a second substrate arranged above the first substrate; a liquid crystal layer arranged between the first substrate and the second substrate; a color filter including a plurality of pixels arranged in a matrix form, the color filter is arranged between the second substrate and the liquid crystal layer, and a gap is arranged between the adjacent pixels; a phosphor power layer arranged between the liquid crystal layer and the first substrate or arranged between the color filter and the liquid crystal layer; and wherein portions of the phosphor power layer corresponding to the gaps on the color filter are removed.

Wherein the first substrate and the second substrate are transparent substrates.

Wherein each of the pixels comprises red sub-pixels and green sub-pixels.

Wherein the phosphor powder layer is a yellow phosphor powder layer.

Wherein the red sub-pixels of the color filter correspond to the red phosphor powder layer, and the green sub-pixels of the color filter correspond to the green phosphor powder layer.

Wherein the dimension of the red sub-pixel is the same with the dimension of the green sub-pixel, and the dimension of the red sub-pixel or green sub-pixel is larger than the dimension of the gap.

Wherein the dimension of the red sub-pixel is larger than the dimension of the green sub-pixel, and the dimension of the green sub-pixel is larger than the dimension of the gap.

Wherein a blue sub-pixel is arranged with the gap.

In view of the above, the liquid crystal device and the liquid crystal panel may increase the light utilization rate so as to enhance the overall performance.

DETAILED DESCRIPTION OF THE EMBODIMENTS

Embodiments of the invention will now be described more fully hereinafter with reference to the accompanying drawings, in which embodiments of the invention are shown.

Figure 1:
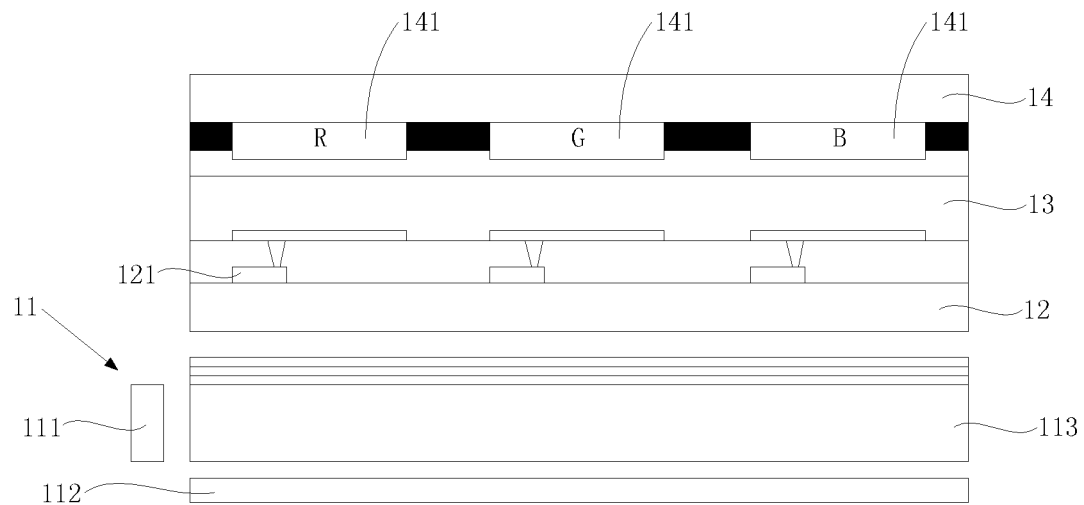
FIG. 1 is a cross sectional view of one conventional LCD.
Figure 2:
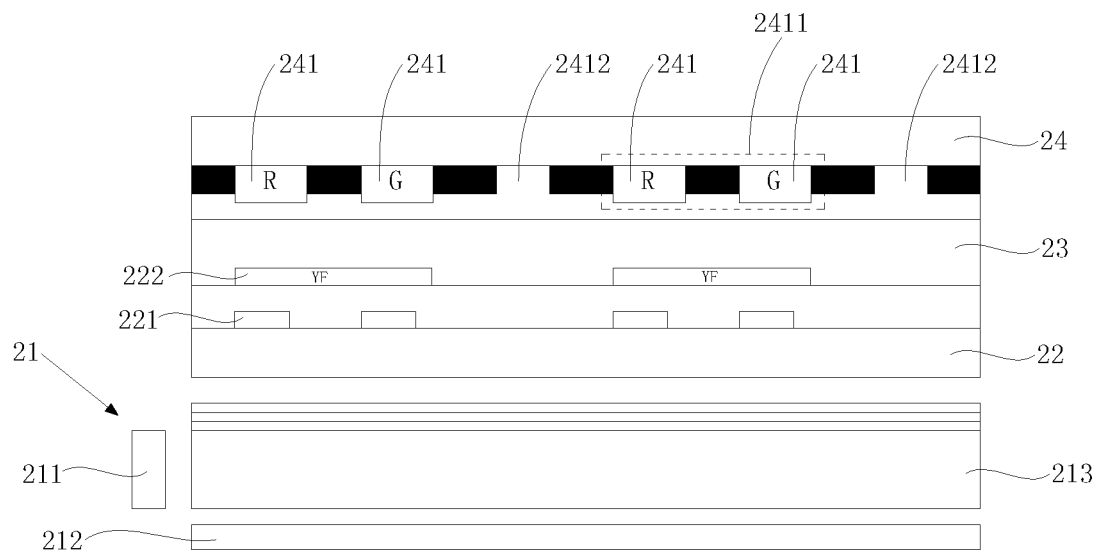
FIG. 2 is a cross sectional view of the LCD in accordance with a first embodiment.

FIG. 2 is a cross sectional view of the LCD in accordance with a first embodiment.

Referring to FIG. 2, in the first embodiment, the LCD includes a backlight module 21, a first substrate 22, a liquid crystal layer 23, and a second substrate 24. The first substrate 22 and the second substrate 24 are made of transparent materials, such as glass.

The backlight module 21 includes a blue light LED 211, a reflective sheet 212, a light guiding plate 213, optical films, and fixing assembly. The blue lights emitted by the LED 211 are transmitted upward to the first substrate 22. The first substrate 22 includes a plurality of thin film transistor (TFT) 221. The blue lights are controlled by the TFTs 221 so as to pass through a phosphor powder layer 222 of the first substrate 22 and the liquid crystal layer 23 and then to arrive at a color filter 241 of the second substrate 24.

In the embodiment, the color filter 241 includes a plurality of pixels 2411 arranged in a matrix, and gaps 2412 are arranged between the pixels 2411. Each of the pixels 2411 includes a red (R) sub-pixel and a green (G) sub-pixel. Each sub-pixels is formed by depositing corresponding photoresist on the second substrate 24. In other words, in the embodiment, the conventional blue (B) sub-pixel is removed so as to form the gap 2412. Correspondingly, portions of the phosphor powder layer corresponding to the gap 2412 on the color filter 241 are removed. That is, a phosphor powder layer 222 is arranged on the first substrate 22 in accordance with the red sub-pixel and green sub-pixel of the color filter 241.

The phosphor powder layer 222 may be a yellow phosphor powder layer (YF). After passing through the phosphor powder layer 222, as the wave length of the blue lights is short, the phosphor particles within the phosphor powder layer 222 are activated and then mixed so as to emit the white lights. The white lights pass through the red sub-pixels and the green sub-pixels on the color filter 241 and respectively displays red and green on the liquid crystal panel of the LCD. The blue lights, which pass through the portions for which the phosphor powder is removed from the phosphor powder layer 222, arrive at the color filter 241 after passing through the liquid crystal layer 23. In addition, the blue lights passes through the color filter 241 directly via the gap 2412 and display blue on the liquid crystal panel of the LCD.

In the embodiment, the blue light LED may be replaced by blue-purple light LED, purple light LED, ultraviolet light LED with short wavelength. In addition, as the yellow phosphor powder layer (YF) absorbs the blue lights passing through, the dimension of the red sub-pixel is the same with that of the green sub-pixel and the dimension of the gap 2412 is smaller than that of any one of the red or green sub-pixel such that the red, green, and blue displayed on the liquid crystal panel may be mixed to form the white lights. In other words, the width of the red sub-pixel is the same with the width of the green sub-pixel, and the width of the gap 2412 is smaller than the width of the red or green sub-pixel.

In the embodiment, as a portion of the blue lights emitted by the blue light LED has passed through the liquid crystal layer 23 directly and are displayed on the liquid crystal panel after passing the gap 2412, less blue lights are absorbed by the phosphor powder layer 222 and the photoresist forming the blue sub-pixels. As such, the light utilization rate and also the performance of the LCD are enhanced.

Figure 3:
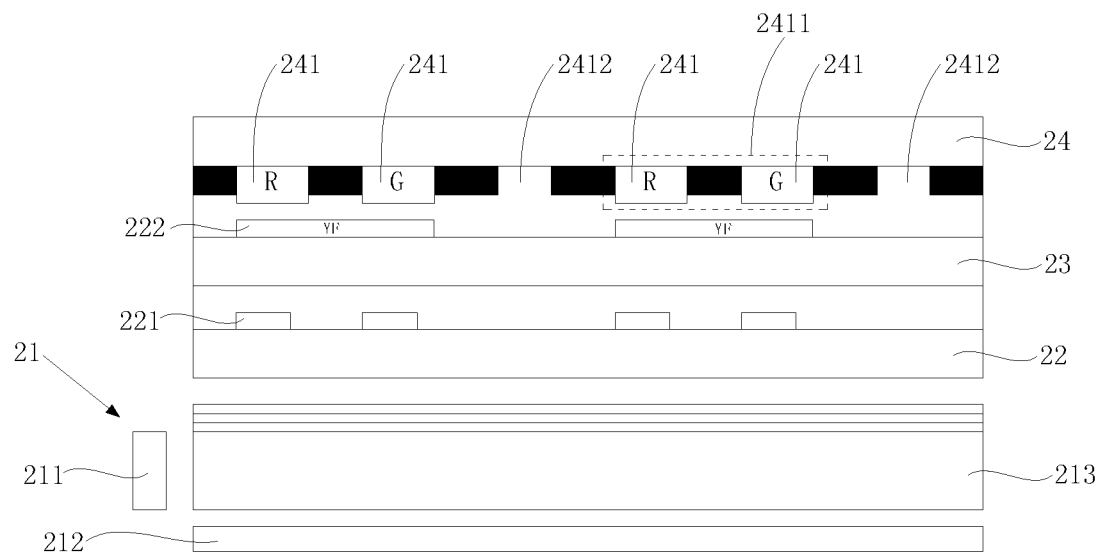
FIG. 3 is a cross sectional view of the LCD in accordance with a second embodiment.

FIG. 3 is a cross sectional view of the LCD in accordance with a second embodiment. It is to be noted that only the difference between the first and the second embodiment will be described hereinafter.

In the embodiment, the first substrate 22 includes a plurality of TFT 221. The blue light LED 211 is controlled by the TFTs 221 to pass through the liquid crystal layer 23 and the phosphor powder layer 222 on the second substrate 24 and then arrive at the color filter 241 on the second substrate 24. That is, the phosphor powder layer 222 is arranged on the second substrate 24, and is arranged between the color filter 241 and the liquid crystal layer 23.

Figure 4:
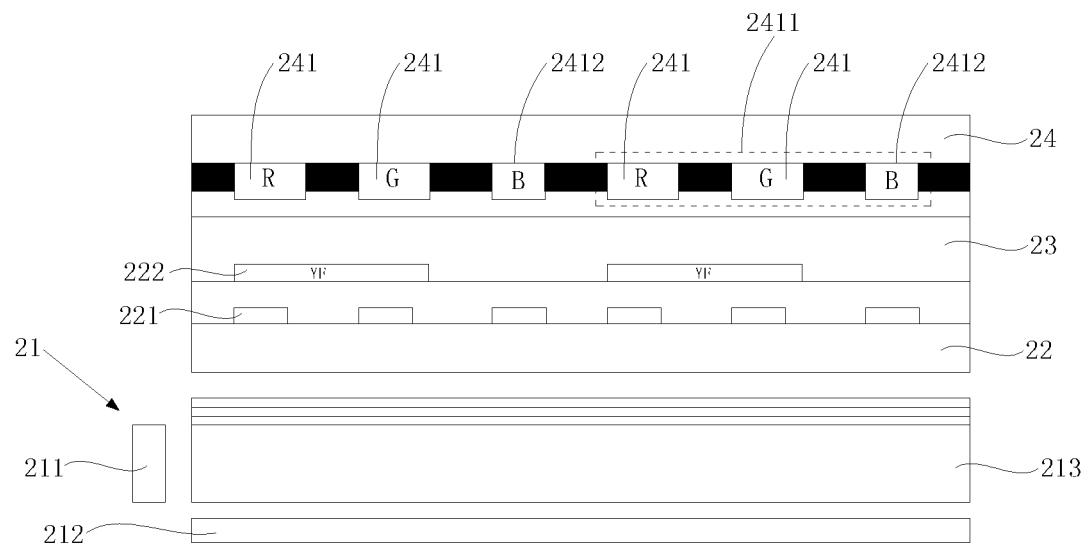
FIG. 4 is a cross sectional view of the LCD in accordance with a third embodiment.

FIG. 4 is a cross sectional view of the LCD in accordance with a third embodiment. It is to be noted that only the difference between the third and the first embodiment will be described hereinafter.

Referring to FIG. 4, a blue (B) sub-pixel is arranged in the gap 2412 of the color filter 241. Each color filter color filter 241 includes a red (R) sub-pixel, a green (G) sub-pixel, and a blue (B) sub-pixel. In addition, as the yellow phosphor powder layer (YF) absorbs the blue lights passing through, the dimension of the red sub-pixel is the same with that of the green sub-pixel and the dimension of the blue sub-pixel is smaller than that of any one of the red or green sub-pixel such that the red, green, and blue displayed on the liquid crystal panel may be mixed to form the white lights. In other words, the width of the red sub-pixel is the same with the width of the green sub-pixel, and the width of the blue sub-pixel is smaller than the width of the red or green sub-pixel.

In the embodiment, as a portion of the blue lights emitted by the blue light LED has passed through the liquid crystal layer 23 directly and are displayed on the liquid crystal panel after passing the blue sub-pixel, less blue lights are absorbed by the phosphor powder layer 222. As such, the light utilization rate and also the performance of the LCD are enhanced.

Figure 5:
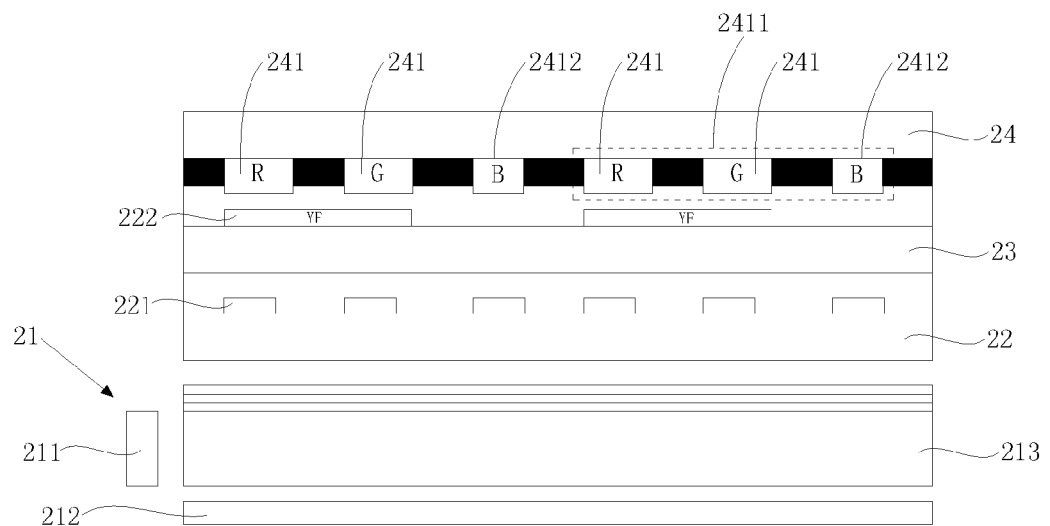
FIG. 5 is a cross sectional view of the LCD in accordance with a fourth embodiment.

FIG. 5 is a cross sectional view of the LCD in accordance with a fourth embodiment. It is to be noted that only the difference between the fourth and the first embodiment will be described hereinafter.

Referring to FIG. 5, in the embodiment, the first substrate 22 includes a plurality of TFT 221. The blue light LED 211 is controlled by the TFTs 221 to emit blue lights. The blue lights pass through the liquid crystal layer 23 and the phosphor powder layer 222 on the second substrate 24, and the blue lights then arrive at the color filter 241 on the second substrate 24. That is, the phosphor powder layer 222 is arranged on the second substrate 24, i.e., between the color filter 241 and the liquid crystal layer 23.

In addition, a blue (B) sub-pixel is arranged in the gap 2412 of the color filter 241. Each color filter color filter 241 includes a red (R) sub-pixel, a green (G) sub-pixel, and a blue (B) sub-pixel. As the yellow phosphor powder layer (YF) absorbs the blue lights passing through, the dimension of the red sub-pixel is the same with that of the green sub-pixel and the dimension of the blue sub-pixel is smaller than that of any one of the red or green sub-pixel such that the red, green, and blue displayed on the liquid crystal panel may be mixed to form the white lights. In other words, the width of the red sub-pixel is the same with the width of the green sub-pixel, and the width of the blue sub-pixel is smaller than the width of the red or green sub-pixel.

In the embodiment, as a portion of the blue lights emitted by the blue light LED has passed through the liquid crystal layer 23 and are displayed on the liquid crystal panel after passing the blue sub-pixel, less blue lights are absorbed by the phosphor powder layer 222. As such, the light utilization rate and also the performance of the LCD are enhanced.

Figure 6:
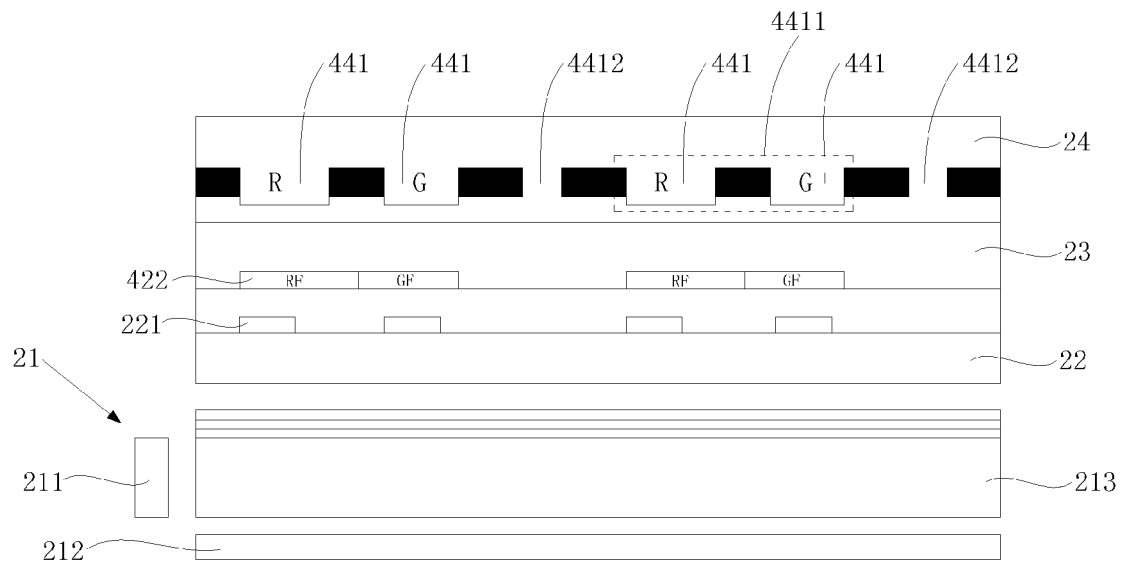
FIG. 6 is a cross sectional view of the LCD in accordance with a fifth embodiment.

FIG. 6 is a cross sectional view of the LCD in accordance with a fifth embodiment.

The LCD includes the LCD includes a backlight module 21, a first substrate 22, a liquid crystal layer 23, and a second substrate 24. The first substrate 22 and the second substrate 24 are made of transparent materials, such as glass.

The backlight module 21 includes a blue light LED 211, a reflective sheet 212, a light guiding plate 213, optical films, and fixing assembly. The blue lights emitted by the LED 211 are transmitted upward to the first substrate 22. The first substrate 22 includes a plurality of thin film transistor (TFT) 221. The blue lights are controlled by the TFTs 221 so as to pass through a phosphor powder layer 422 of the first substrate 22 and the liquid crystal layer 23 and then to arrive at a color filter 441 of the second substrate 24.

In the embodiment, the color filter 441 includes a plurality of pixels 4411 arranged in a matrix, and a gap 4412 is arranged between the adjacent pixels 2411. Each of the pixels 2411 includes a red (R) sub-pixel and a green (G) sub-pixel. Each sub-pixels is formed by depositing corresponding photoresist on the second substrate 24. In other words, in the embodiment, the conventional blue (B) sub-pixel is removed so as to form the gap 4412. Correspondingly, the portions corresponding to the gap 4412 on the color filter 241 of the phosphor powder layer 442 are removed. That is, a phosphor powder layer 422 is arranged on the first substrate 22 in accordance with the red sub-pixel and green sub-pixel of the color filter 441.

The phosphor powder layer 422 may include a red phosphor powder layer (RF) and a green phosphor powder layer (GF). The red sub-pixel on the color filter 441 corresponds to the red phosphor powder layer (RF), and the green sub-pixel on the color filter 441 corresponds to the green phosphor powder layer (GF).

After passing through the phosphor powder layer 422, a portion of the blue lights are turned into red lights by the red phosphor powder layer (RF) and a portion of the blue lights are turned into green lights by the green phosphor powder layer (GF). That is, after being passed through by the blue lights, the red phosphor powder layer (RF) emits the blue lights and the red lights, and the green phosphor powder layer (GF) emits the blue lights and the green lights. The blue and red lights emitted from the red phosphor powder layer (RF) pass through the red sub-pixels on the color filter 441 to display red. The blue and green lights emitted from the green phosphor powder layer (GF) pass through the green sub-pixels on the color filter 441 to display green. Thus, the liquid crystal panel displays red and green. The blue lights pass through the portions of the phosphor powder layer 422 for which the phosphor power are removed, the liquid crystal layer 23, and the gap 4412 of the color filter 441, and then are displayed on the liquid crystal panel.

In the embodiment, the blue light LED may be blue-purple light LED, purple light LED, ultraviolet light LED with short wavelength. As the red phosphor powder layer (RF) and the green phosphor powder layer (GF) absorb the blue lights passing through and the absorbing rate, relating to the blue lights, of the red phosphor powder layer (RF) is larger than that of the green phosphor powder layer (GF), the dimension of the red sub-pixel is larger than the dimension of the green sub-pixel, and the dimension of the green sub-pixel is larger than the dimension of the gap. As such, the red, green, and blue displayed on the liquid crystal panel may be mixed to form the white lights.

In the embodiment, as a portion of the blue lights emitted by the blue light LED has passed through the liquid crystal layer 23 directly and is displayed on the liquid crystal panel after passing the gap 4412, less blue lights are absorbed by the phosphor powder layer 422 and the photoresist forming the blue sub-pixels. As such, the light utilization rate and also the performance of the LCD are enhanced.

Figure 7:
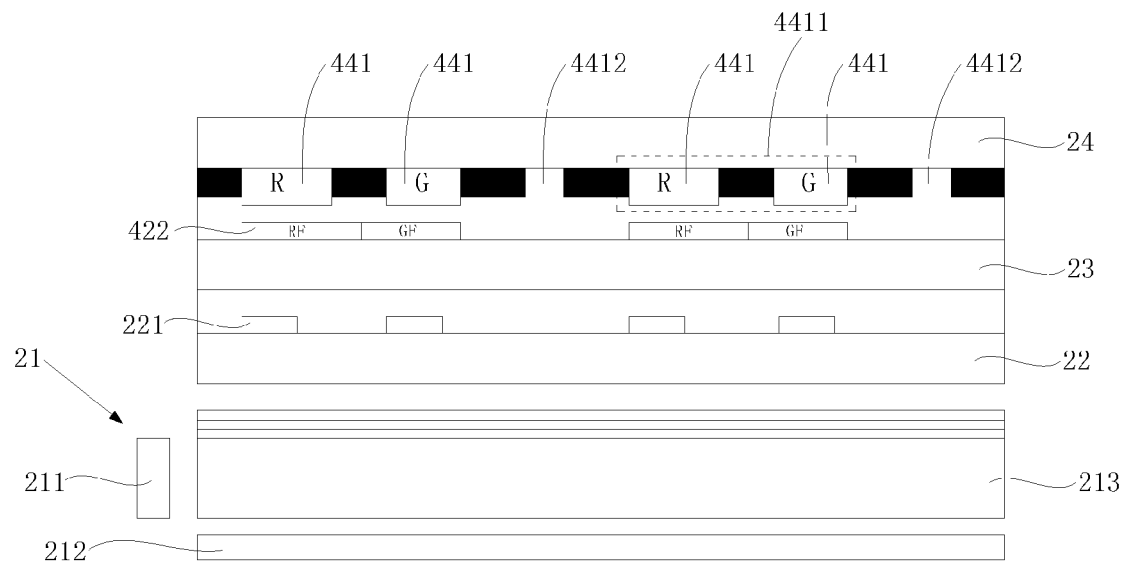
FIG. 7 is a cross sectional view of the LCD in accordance with a sixth embodiment.

FIG. 7 is a cross sectional view of the LCD in accordance with a sixth embodiment. It is to be noted that only the difference between the sixth and the fifth embodiment will be described hereinafter.

In the embodiment, the first substrate 22 includes a plurality of TFTs 221. The blue lights are controlled by the TFTs 221 so as to pass through a phosphor powder layer 422 of the second substrate 24 and the liquid crystal layer 23 and then to arrive at a color filter 441 of the second substrate 24. In the embodiment, the phosphor powder layer 422 is arranged on the second substrate 24, i.e., between the color filter 441 and the liquid crystal layer 23.

Figure 8:
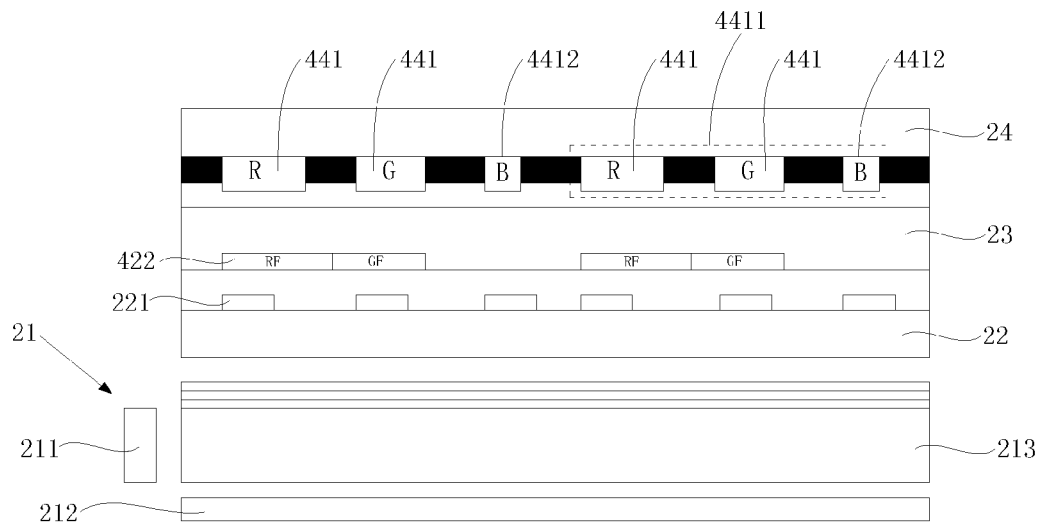
FIG. 8 is a cross sectional view of the LCD in accordance with a seventh embodiment.

FIG. 8 is a cross sectional view of the LCD in accordance with a seventh embodiment. It is to be noted that only the difference between the seventh and the fifth embodiment will be described hereinafter.

Referring to FIG. 8, a blue (B) sub-pixel is arranged in the gap 4412 of the color filter 441. Each color filter color filter 241 includes a red (R) sub-pixel, a green (G) sub-pixel, and a blue (B) sub-pixel. In addition, as the red phosphor powder layer (RF) and the green phosphor powder layer (GF) absorb the blue lights passing through and the absorbing rate, relating to the blue lights, of the red phosphor powder layer (RF) is larger than that of the green phosphor powder layer (GF), the dimension of the red sub-pixel is larger than the dimension of the green sub-pixel, and the dimension of the green sub-pixel is larger than the dimension of the gap.

In the embodiment, as a portion of the blue lights emitted by the blue light LED has passed through the liquid crystal layer 23 and is displayed on the liquid crystal panel after passing the blue sub-pixel arranged within the gap 4412, less blue lights are absorbed by the phosphor powder layer 422. As such, the light utilization rate and also the performance of the LCD are enhanced.

Figure 9:
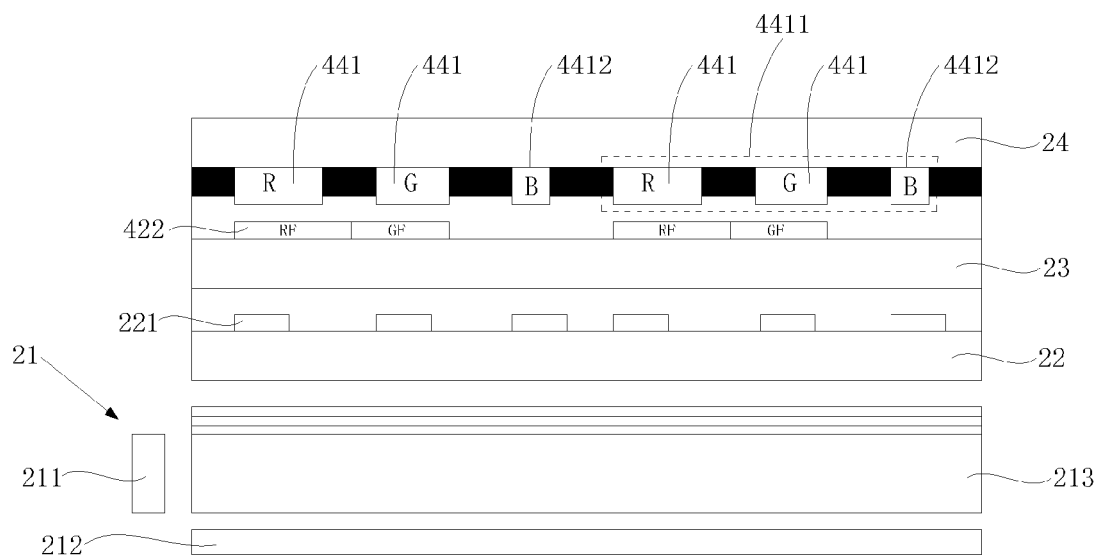
FIG. 9 is a cross sectional view of the LCD in accordance with an eighth embodiment.

FIG. 9 is a cross sectional view of the LCD in accordance with an eighth embodiment. It is to be noted that only the difference between the eighth and the fifth embodiment will be described hereinafter.

In the embodiment, the first substrate 22 includes a plurality of TFTs 221. The blue lights are controlled by the TFTs 221 so as to pass through a phosphor powder layer 422 of the second substrate 24 and the liquid crystal layer 23 and then to arrive at a color filter 441 of the second substrate 24. In the embodiment, the phosphor powder layer 422 is arranged on the second substrate 24, i.e., between the color filter 441 and the liquid crystal layer 23.

In the embodiment, a blue (B) sub-pixel is arranged in the gap 4412 of the color filter 441. Each color filter color filter 241 includes a red (R) sub-pixel, a green (G) sub-pixel, and a blue (B) sub-pixel. As the red phosphor powder layer (RF) and the green phosphor powder layer (GF) absorb the blue lights passing through and the absorbing rate, relating to the blue lights, of the red phosphor powder layer (RF) is larger than that of the green phosphor powder layer (GF), the dimension of the red sub-pixel is larger than the dimension of the green sub-pixel, and the dimension of the green sub-pixel is larger than the dimension of the gap. As such, the red, green, and blue displayed on the liquid crystal panel may be mixed to form the white lights.

In the embodiment, as a portion of the blue lights emitted by the blue light LED has passed through the liquid crystal layer 23 and is displayed on the liquid crystal panel after passing the blue sub-pixel arranged within the gap 4412, less blue lights are absorbed by the phosphor powder layer 422. As such, the light utilization rate and also the performance of the LCD are enhanced.

Figure 10:
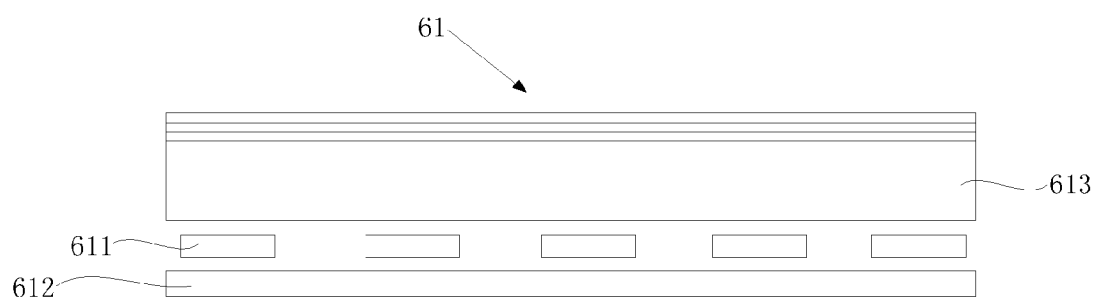
FIG. 10 is a cross sectional view of the direct-lit backlight module in accordance with one embodiment.

It is to be noted that, in one embodiment, the edge-type backlight module may be replaced by a direct-lit backlight module. FIG. 10 is a cross sectional view of the direct-lit backlight module in accordance with one embodiment.

Referring to FIG. 10, the direct-lit backlight module 61 includes a light source, such as blue or purple light LED 611, a reflective sheet 612, a diffusion plate 613, optical films, and fixing assembly. In the embodiment, the light source 611 of the direct-lit backlight module is fixed below the diffusion plate 613. Similarly, the lights emitted by the first sheet set 611 are transmitted upward to the transparent glass substrate after passing through the reflective sheet 612, the diffusion plate 613, and the above-mentioned components.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal device, comprising:
a backlight module comprising a light source;
a first substrate comprising a plurality of TFTs, and the first substrate is arranged above the backlight module;
a second substrate arranged above the first substrate;
a liquid crystal layer arranged between the first substrate and the second substrate;
a color filter comprising a plurality of pixels arranged in a matrix form, the color filter is arranged between the second substrate and the liquid crystal layer, and a gap is arranged between the adjacent pixels;
a phosphor power layer arranged between the liquid crystal layer and the first substrate or arranged between the color filter and the liquid crystal layer; and
wherein portions of the phosphor power layer corresponding to the gaps on the color filter are removed, and lights emitted from the light source passes through the phosphor powder layer and arrive at the color filter.

2. The liquid crystal device as claimed in claim 1, wherein the light source is blue light LED, blue-purple light LED, purple light LED, ultraviolet light LED or a combination of the blue light LED, blue-purple light LED, purple light LED, and ultraviolet light LED.

3. The liquid crystal device as claimed in claim 1, wherein the first substrate and the second substrate are transparent substrates.

4. The liquid crystal device as claimed in claim 1, wherein the backlight module is a direct-lit or an edge-type backlight module.

5. The liquid crystal device as claimed in claim 1, wherein each of the pixels comprises red sub-pixels and green sub-pixels.

6. The liquid crystal device as claimed in claim 5, wherein the phosphor powder layer is a yellow phosphor powder layer.

7. The liquid crystal device as claimed in claim 6, wherein the dimension of the red sub-pixel is the same with the dimension of the green sub-pixel, and the dimension of the red sub-pixel or green sub-pixel is larger than the dimension of the gap.

8. The liquid crystal device as claimed in claim 5, wherein the red sub-pixels of the color filter correspond to the red phosphor powder layer, and the green sub-pixels of the color filter correspond to the green phosphor powder layer.

9. The liquid crystal device as claimed in claim 8, wherein the dimension of the red sub-pixel is larger than the dimension of the green sub-pixel, and the dimension of the green sub-pixel is larger than the dimension of the gap.

10. The liquid crystal device as claimed in claim 1, wherein a blue sub-pixel is arranged with the gap.

11. A liquid crystal panel, comprising:
a first substrate comprising a plurality of TFTs, and the first substrate is arranged above the backlight module;
a second substrate arranged above the first substrate;
a liquid crystal layer arranged between the first substrate and the second substrate;
a color filter comprising a plurality of pixels arranged in a matrix form, the color filter is arranged between the second substrate and the liquid crystal layer, and a gap is arranged between the adjacent pixels;
a phosphor power layer arranged between the liquid crystal layer and the first substrate or arranged between the color filter and the liquid crystal layer; and
wherein portions of the phosphor power layer corresponding to the gaps on the color filter are removed.

12. The liquid crystal panel as claimed in claim 11, wherein the first substrate and the second substrate are transparent substrates.

13. The liquid crystal panel as claimed in claim 11, wherein each of the pixels comprises red sub-pixels and green sub-pixels.

14. The liquid crystal panel as claimed in claim 13, wherein the phosphor powder layer is a yellow phosphor powder layer.

15. The liquid crystal panel as claimed in claim 14, wherein the dimension of the red sub-pixel is the same with the dimension of the green sub-pixel, and the dimension of the red sub-pixel or green sub-pixel is larger than the dimension of the gap.

16. The liquid crystal panel as claimed in claim 13, wherein the red sub-pixels of the color filter correspond to the red phosphor powder layer, and the green sub-pixels of the color filter correspond to the green phosphor powder layer.

17. The liquid crystal panel as claimed in claim 16, wherein the dimension of the red sub-pixel is larger than the dimension of the green sub-pixel, and the dimension of the green sub-pixel is larger than the dimension of the gap.

18. The liquid crystal panel as claimed in claim 1, wherein a blue sub-pixel is arranged with the gap.

* * * * *